(12) United States Patent
Ma

(10) Patent No.: US 6,495,618 B1
(45) Date of Patent: Dec. 17, 2002

(54) GRAFT COPOLYMER WITH AN AMIDE FUNCTIONAL GROUP AS A PIGMENT DISPERSANT

(75) Inventor: Sheau-Hwa Ma, Chadds Ford, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/466,259

(22) Filed: Dec. 17, 1999

(51) Int. Cl.⁷ .............................................. C08F 271/02
(52) U.S. Cl. .......................... 524/81; 525/280; 525/279; 525/293; 525/294; 525/296
(58) Field of Search .............................. 524/81; 525/279, 525/280, 293, 294, 296

(56) References Cited

U.S. PATENT DOCUMENTS

| | | | |
|---|---|---|---|
| 3,257,340 A | 6/1966 | Osmond et al. ................ 260/4 |
| 3,580,880 A | 5/1971 | Clark et al. ............ 260/29.6 R |
| 3,753,760 A | 8/1973 | Kosel ..................... 117/37 LE |
| 3,819,559 A | 6/1974 | Barabas | |
| 3,900,412 A | 8/1975 | Kosel ........................ 252/62.1 |
| 3,990,980 A | 11/1976 | Kosel .................... 252/62.1 L |
| 4,075,141 A | 2/1978 | Porter, Jr. et al. ......... 260/17.2 |
| 4,284,740 A | 8/1981 | Chang | |
| 4,414,353 A | 11/1983 | Maslanka et al. | |
| 4,656,226 A | 4/1987 | Hutchins et al. .............. 525/93 |
| 4,722,984 A | 2/1988 | Janowicz .................... 526/123 |
| 4,755,563 A | 7/1988 | West ........................... 525/287 |
| 4,812,517 A | 3/1989 | West ........................... 825/94 |
| 5,006,406 A | 4/1991 | Kovacs et al. ............. 428/323 |
| 5,085,966 A | 2/1992 | Suzuki et al. | |
| 5,231,131 A | 7/1993 | Chu et al. | |
| 5,424,364 A | 6/1995 | Simms et al. ................ 525/170 |
| 5,753,759 A | 5/1998 | Hartmann et al. .......... 525/218 |
| 5,756,433 A | 5/1998 | Auschra et al. | |
| 5,770,648 A | 6/1998 | Antonelli et al. | |
| 5,852,123 A | 12/1998 | Huybrechts ................. 525/282 |

FOREIGN PATENT DOCUMENTS

| | | |
|---|---|---|
| AU | 707869 | 7/1999 |
| DE | 19651243 A1 | 6/1998 |
| JP | 50-115298 | 9/1975 |
| JP | 04198351 | 7/1992 |
| WO | 97/34934 | 9/1997 |

OTHER PUBLICATIONS

Copy of International Search Report dated Sep. 4, 2001.

Primary Examiner—Edward J. Cain
(74) Attorney, Agent, or Firm—Steven C. Benjamin

(57) ABSTRACT

A polymer dispersant for pigments based on a graft copolymer wherein the graft copolymer has a weight average molecular weight of at least 3000 and has 10 to 90% by weight of a polymeric backbone and 90 to 10% by weight of macromonomer side chains attached to the backbone and wherein at least 20% by weight of the polymeric backbone has attached thereto an amide group which serves as a pigment anchoring group. The backbone may also have attached thereto an additional pigment anchoring group selected from the group consisting of aromatic ester, aromatic amine, aliphatic amine, and quaternary ammonium groups, or mixtures thereof. These materials disperse a wide variety of pigments and are useful in solvent borne coatings where they can provide improved efficiency of pigment use, lower paint viscosity, and reduced emission of volatile organic solvent.

21 Claims, No Drawings

GRAFT COPOLYMER WITH AN AMIDE FUNCTIONAL GROUP AS A PIGMENT DISPERSANT

BACKGROUND OF THE INVENTION

This invention relates to polymeric pigment dispersants, more particularly it relates to graft copolymers having amide functional groups useful for dispersing a wide variety of pigments.

Polymeric materials have been previously known which are effective for dispersing solid pigments in organic solvents and used to form pigment dispersions of uniform color useful in formulating solvent borne paint compositions. Nowadays, such pigment dispersions are widely used, for example, in exterior solvent borne paints for automobiles and trucks.

Much of the past activity concerning polymeric dispersants has been with random copolymers, but these relatively inefficient materials are being replaced by structured pigment dispersants, such as those having graft copolymer (or comb) structures, as for example, as taught in Huybrechts U.S. Pat. No. 5,852,123 issued Dec. 22, 1998. Such graft copolymers are generally composed of a macromonomer grafted onto a polymer backbone and have attached to either the macromonomer or backbone, a polar group known as a pigment anchoring group which is designed to adsorb on the surface of a pigment particle and thereby anchor the polymer to the pigment surface. While the past work indicates that graft copolymers are outstanding dispersants, they also suffer from certain significant drawbacks. For instance, they are not selectively adsorbed by certain pigment types and are oftentimes displaced from pigment surfaces by polar solvents or other polar groups present in the paint system. Ineffective anchoring of the dispersant to a pigment particle surface is highly undesired, since it allows the pigment particles to flocculate or cluster together and results in pigment dispersions and ultimately paints of poor color quality.

Therefore, there is still a need to improve the performance of such pigment dispersants, and in particular to find new graft copolymers that are more effective in dispersing a wider range of pigments.

SUMMARY OF THE INVENTION

The present invention provides a composition suitable for use as a pigment dispersant, which comprises a graft copolymer having a macromonomer grafted onto a polymeric backbone, wherein the graft copolymer contains an amide functional group as a pigment anchoring group in the backbone and preferably also contains an additional pigment anchoring group in the backbone selected from the group consisting of aromatic ester, aromatic amine, aliphatic amine, and quaternary ammonium groups, or mixtures thereof. The pigment anchoring groups are attached to the graft copolymer either by copolymerization with the backbone or by reaction with appropriate functional groups on the backbone. The graft copolymer may also contain other functional groups, such as hydroxyl groups, in either or both the backbone or macromonomer for crosslinking the dispersant into the final thermoset paint composition.

The polymeric backbone comprises about 10 to 90% by weight of the graft copolymer, preferably 20 to 80% by weight, and the macromonomer comprises about 90 to 10% by weight of the graft copolymer, preferably 80 to 20% by weight, and at least about 20% by weight of the backbone contains amide functional groups. The backbone preferably also contains at least about 1% by weight, based on the total weight of the backbone, of an additional pigment anchoring group. The graft copolymer preferably further contains up to about 30% by weight, based on the total weight of the graft copolymer, of hydroxyl groups in either or both the backbone or macromonomer.

The pigment dispersant of this invention is produced by a macromonomer approach which involves grafting a macromonomer (which becomes the side chain of the graft copolymer) onto a polymeric backbone. The macromonomer is polymerized first in the presence of cobalt (II) and cobalt (III) complexes as catalytic chain transfer agents to produce macromonomers having only one terminal ethylenically unsaturated group. The macromonomer is then copolymerized with ethylenically unsaturated backbone monomers, which polymerize to form a backbone polymer with macromonomer side chains grafted thereto. The amide functionality in the backbone is preferably obtained by adding ethylenically unsaturated amide functional monomers during polymerization of the backbone. The additional pigment anchoring group is preferably obtained by reaction with suitable functional groups also present on the backbone segment.

A non-flocculating pigment dispersion is readily formed by combining the pigment dispersant of this invention with any number of commercially available pigments and an appropriate organic liquid carrier. Such dispersions are particularly useful in solvent borne paints where they can impart uniform color to the paint and, at the same time, provide improved efficiency of pigment use, lower paint viscosity, and reduced emission of volatile organic solvents.

DETAILED DESCRIPTION OF THE INVENTION

The pigment dispersant of this invention comprises a graft copolymer preferably produced by a macromonomer approach which involves grafting a macromonomer onto a polymeric backbone. The macromonomer which contains only one terminal ethylenically unsaturated group becomes the side chain of the graft copolymer and is prepared first. It is then copolymerized with ethylenically unsaturated monomers chosen for the backbone composition to form the graft structure.

To ensure that the macromonomers only have one terminal ethylenically unsaturated group which will polymerize with the backbone monomers, the macromonomers are most conveniently prepared by a free radical polymerization method, wherein the macromonomer is polymerized in the presence of a catalytic cobalt chain transfer agent containing a $Co^{2+}$ group, a $Co^{3+}$ group, or both. Typically, the macromonomer is prepared by polymerizing an acrylic monomer or blend of such monomers, in particular methacrylate based monomers, in the presence of a cobalt chain transfer agent. The macromonomer polymerization is carried out in an organic solvent or solvent blend using conventional polymerization initiators.

Preferred cobalt chain transfer agents that can be used to form the macromonomer are described in U.S. Pat. No. 4,722,984 to Janowicz. Most preferred cobalt chain transfer agents are pentacyano cobaltate (II), diaquabis (borondiflurodimethylglyoximato) cobaltate (II), and diaquabis (borondifluorophenylglyoximato) cobaltate (II). Typically, these chain transfer agents are used at concentrations of about 2–5000 ppm based upon the particular monomers being polymerized and the desired molecular weight.

By using such concentrations, macromonomers having a weight average molecular weight (Mw) in the range of about 1,000 to 50,000, preferably about 1,000 to 10,000, can be conveniently prepared.

Typical solvents that can be used to form the macromonomer are alcohols, such as methanol, ethanol, n-propanol, and isopropanol; ketones, such as acetone, butanone, pentanone, hexanone, and methyl ethyl ketone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and, glycols such as ethylene glycol and propylene glycol; and mixtures thereof.

Any of the commonly used azo or peroxy polymerization initiators can be used for preparation of the macromonomer provided it has solubility in the solution of the solvents and the monomer mixture, and has an appropriate half life at the temperature of polymerization. "Appropriate half life" as used herein is a half life of about 10 minutes to 4 hours. Most preferred are azo type initiators such as 2,2'-azobis (isobutyronitrile), 2,2'-azobis(2,4-dimethylvaleronitrile), 2,2'-azobis(methylbutyronitrile), and 1,1'-azobis (cyanocyclohexane). Examples of peroxy based initiators are benzoyl peroxide, lauroyl peroxide, t-butyl peroxypivalate, t-butyl peroctoate which may also be used provided they do not adversely react with the chain transfer agents under the reaction conditions for macromonomers.

The macromonomer contains a single terminal ethylenically unsaturated group, and primarily contains polymerized acrylic monomers and in particular polymerized methacrylic acid or methacrylate monomers. Preferred monomers include methacrylic acid, alkyl methacrylates, cycloaliphatic methacrylates, and aryl methacrylates. Typical alkyl methacrylates that can be used have 1–18 carbon atoms in the alkyl group such as methyl methacrylate, ethyl methacrylate, propyl methacrylate, isopropyl methacrylate, n-butyl methacrylate, isobutyl methacrylate, t-butyl methacrylate, pentyl methacrylate, hexyl methacrylate, 2-ethyl hexyl methacrylate, nonyl methacrylate, lauryl methacrylate, stearyl methacrylate, ethoxytriethyleneglycol methacrylate, and the like. Cycloaliphatic methacrylates can be used such as trimethylcyclohexyl methacrylate, t-butyl cyclohexyl methacrylate, cyclohexyl methacrylate, isobornyl methacrylate, and the like. Aryl methacrylates can also be used such as benzyl methacrylate, phenyl methacrylate, and the like.

Other ethylenically unsaturated derivatives can be used for forming the macromonomer such as acrylic acid, alkyl acrylates, cycloaliphatic acrylates, and aryl acrylates. Typical alkyl acrylates have 1–18 carbon atoms in the alkyl group such as methyl acrylate, ethyl acrylate, propyl acrylate, isopropyl acrylate, n-butyl acrylate, isobutyl acrylate, t-butyl acrylate, 2-ethyl hexyl acrylate, nonyl acrylate, lauryl acrylate, 2-(2-ethoxyethoxy)ethyl acrylate, and the like. Cycloaliphatic acrylates can be used such as cyclohexylacrylate, trimethylcyclohexylacrylate, t-butyl cyclohexyl acrylate, and the like. Aryl acrylates such as benzyl acrylate, 2-phenoxyethyl acrylate, and the like. Vinyl aromatics such as styrene, t-butyl styrene, vinyl toluene, and the like, can also be used.

Other more complex methods may also be used to prepare the macromonomers such as making a polymer with a reactive end which is then treated with reagent(s) to create the terminal polymerizable double bond.

After the macromonomer is formed, solvent is optionally stripped off and the backbone monomers are added to the macromonomer along with additional solvent and polymerization initiator, in order to prepare the basic graft copolymer structure by conventional free radical polymerization. The backbone monomers are copolymerized with the macromonomers using any of the conventional azo or peroxide type initiators and organic solvents as described above. The backbone so formed contains polymerized ethylenically unsaturated monomers which will be described below as well as minor amounts of any of the monomers listed above for use in the macromonomer may also be used in the backbone. Polymerization is generally carried out at or below reflux temperature until a graft copolymer is formed of desired molecular. The graft copolymer useful in the present invention typically has a weight average molecular weight (Mw) of about 3,000 to 100,000, preferably from about 5,000 to 50,000.

The graft copolymer thus formed is composed of a backbone having a plurality of macromonomer "side chains" or "side arms" attached thereto, which structure is often referred to as a "comb" structure. The pigment anchoring groups employed in this invention are built into the backbone of the graft copolymer.

The pigment anchoring groups having amide functionality can be, and preferably are, attached to the graft copolymer by addition of appropriate ethylenically unsaturated amide functional monomers during the polymerization of the backbone. Preferred monomers are ethylenically unsaturated monomers having an acyclic amide group and in particular substituted or unsubstituted acrylamides and methacrylamides. Typically useful ethylenically unsaturated monomers having an acyclic amide group are represented by the formula

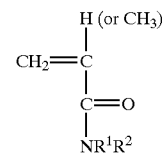

wherein $R^1$ and $R^2$ are each independently selected from the group consisting of hydrogen, alkyl group, aryl group, arylalkyl group, and alkylaryl group having 1 to 20 carbon atoms, and optionally containing one or more substituents that do not interfere with the polymerization process. Such substituents may include alkyl, hydroxy, amino, ester, acid, acyloxy, amide, nitrile, halogen, alkoxy, etc. Useful examples include methacrylamides such as N-methylmethacrylamide, N-ethylmethacrylamide, N-octylmethacrylamide, N-dodecylmethacrylamide, N-(isobutoxymethyl)methacrylamide, N-phenylmethacrylamide, N-benzylmethacrylamide, N,N-dimethylmethacrylamide, and the like; and acrylamides such as N-methyl acrylamide, N-ethylacrylamide, N-t-butylacrylamide, N-(isobutoxymethyl)acrylamide, N,N-dimethylacrylamide, N,N-diethylacrylamide, N,N-dibutyl acrylamide, and the like.

Other preferred amide functional monomers include ethylenically unsaturated monomers containing a cyclic amide group and in particular substituted or unsubstituted acrylic, acrylamide, or N-vinyl monomers. Typically useful monomers are ethylenically unsaturated monomers having a cyclic amide group represented by the formula

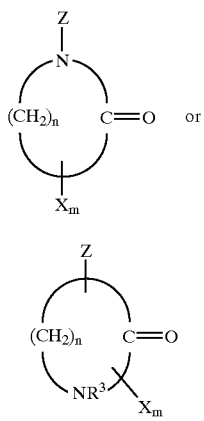

(1)

(2)

wherein n=3–7, preferably 3–5, m=0–3, X is a substituent on the cyclic structure and may be selected from the group consisting of alkyl group, aryl group, arylalkyl group, and alkylaryl group having 1 to 20 carbon atoms, and may contain substituents which do not interfere with polymerization such as hydroxy, amino, ester, acid, acyloxy, amide, nitrile, halogen, alkoxy, etc., $R^3$ is selected from the group consisting of hydrogen, alkyl group, aryl group, arylalkyl group, and alkylaryl group having 1 to 20 carbon atoms, and may contain substituents which do not interfere with polymerization such as hydroxy, amino, ester, acid, acyloxy, amide, nitrile, halogen, alkoxy, etc., and Z is a radical center which is connected to the rest of the ethylenically unsaturated monomer structure.

Useful examples of acrylic or acrylamide monomers are represented by the formula

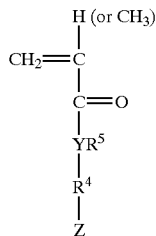

where Y is O or N, $R^4$ is selected from the group consisting of alkyl group, aryl group, arylalkyl group, and alkylaryl group having 1 to 20 carbon atoms and may contain substituents which do not interfere with polymerization such as hydroxy, amino, ester, acid, acyloxy, amide, nitrile, halogen, alkoxy, etc., $R^5$ does not exist when Y is O but when Y is N, $R^5$ is selected from the group consisting of hydrogen, alkyl group, aryl group, arylalkyl group, and alkylaryl group having 1 to 20 carbon atoms and may contain substituents which do not interfere with polymerization such as hydroxy, amino, ester, acid, acyloxy, amide, nitrile, halogen, alkoxy, etc., and Z is a radical center which is connected to structure (1) or (2).

Useful examples of N-vinyl monomers are represented by the formula

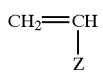

where Z is a radical center which is connected to structure (1). The most useful example is N-vinyl-2-pyrrolidinone.

As indicated above, concentration of the amide functional pigment anchoring group in the backbone should be at least about 20% by weight, and preferably comprises at least about 30% by weight, based on the total weight of the backbone. At lower concentrations, there may not be sufficient interaction with the pigment to avoid flocculation, particularly in more polar solvents. At higher concentrations, generally above 30% by weight, low polarity solvents may not be satisfactory solvents for the dispersants.

The additional pigment anchoring groups, if any, can be attached as pendant groups to the graft copolymer either by addition of suitable ethylenically unsaturated monomers containing the appropriate pigment anchoring groups during the polymerization of the backbone, or by reacting functional groups, other than the amide groups, on the backbone with suitable pigment anchoring group precursor compounds following the formation of the graft copolymer structure. The additional pigment anchoring groups useful in the present invention include:

(1) aromatic ester groups,
(2) aromatic amine groups,
(3) aliphatic amine groups
(4) cationic quaternary ammonium groups, or
(5) any mixtures thereof.

If employed, the concentration of the additional pigment anchoring group(s) in the backbone should be at least about 1% by weight, preferably at least about 5% by weight, based on the total weight of the backbone.

The aromatic ester anchoring groups, in particular, can be, and preferably are, attached as pendant groups to the basic graft copolymer by reacting epoxy functional groups built into the backbone with an aromatic carboxylic acid. The reaction conditions should be chosen so that 100% of the epoxy groups are reacted (i.e., esterified), or as close to 100% as can be reasonably achieved, leaving essentially no unreacted epoxy groups in the dispersant molecule which can have negative effects on dispersant performance. A catalytic amount of a tertiary amine or a quaternary ammonium salt can be advantageously used to accelerate the reaction and drive it to completion. A useful example is benzyltrimethyl ammonium hydroxide. The synthesis of copolymers having epoxy functional groups is well known. For example, the epoxy functional group may be obtained by adding epoxy functional ethylenically unsaturated monomers during polymerization of the backbone. Acrylic monomers are generally preferred, and in particular epoxy functional acrylate and methacrylate monomers, especially glycidyl methacrylate. The aromatic carboxylic acids useful herein may be unsubstituted or may contain substituents, such as, e.g., nitro groups, hydroxy, amino, ester, acryloxy, amide, nitrile, halogen, haloalkyl, alkoxy, and the like. Preferred aromatic carboxylic acids are benzoic acid, 2-nitrobenzoic acid, 3-nitrobenzoic acid, 4-nitrobenzoic acid, 3,5-dinitrobenzoic acid, 1-naphthoic acid, 3-chlorobenzoic acid, 4-biphenyl carboxylic acid, n-phthaloyl glycine, 4-sulfamido benzoic acid, and the like.

The aromatic amine anchoring groups can be, and preferably are, added to the basic graft copolymer by reacting epoxy functional groups provided on the backbone with a secondary aromatic amine. Again, the reaction conditions should be chosen so that substantially all of the epoxy groups are reacted. The epoxy groups can be placed on the graft copolymer by the method described above. The epoxy groups are then reacted in a subsequent reaction with the secondary aromatic amine precursor compounds to form a graft copolymer having pendant tertiary aromatic amine functionality. The secondary aromatic amines useful in this invention may be unsubstituted or may contain substituents such as, e.g., hydroxy, ester, acyloxy, amide, nitrile, halogen, haloalkyl, alkoxy, and the like. Preferred secondary aromatic amines include N-benzyl methylamine, N-benzylethanolamine, N,N-dibenzylamine, 2-(2-methylaminoethyl)pyridine, 1-phenylpiperazine, 1-benzyl piperazine, 3-(3-pyridylmethylamines)propionitrile, and the like. Alternatively, the pendant aromatic amine groups may be introduced to the graft copolymer by using instead a precursor compound containing both a tertiary aromatic amine and a carboxylic acid functional group in the esterification reaction described above. Useful examples of such compounds include nicotinic acid, picolinic acid, isonicotinic acid, indole-3-acetic acid, and the like. Alternatively, aromatic amine containing monomers, such as 4-aminostyrene, 2-vinyl pyridine, 4-vinyl pyridine, and the like, may be directly copolymerized into the graft copolymer to form the aromatic amine anchoring groups, if desired.

The aliphatic amine anchoring groups can be, and preferably are, attached to the backbone by addition of suitable ethylenically unsaturated monomers which contain tertiary aliphatic amine functional groups during polymerization of the backbone. Acrylic monomers are generally preferred and in particular tertiary amine functional acrylate and methacrylate monomers. Preferred monomers include N,N-dimethylaminoethyl acrylate, N,N-dimethylaminoethyl methacrylate, N,N-diethylaminoethyl acrylate, N,N-diethylaminoethyl methacrylate, N-t-butylaminoethyl methacrylate, 2-N-morpholinoethyl acrylate, 2-N-morpholinoethyl methacrylate, and the like. Alternatively, the aliphatic amine anchoring groups may be obtained by reacting a secondary aliphatic amine with a copolymer containing epoxy groups as described above.

The amine anchoring groups prepared above can be further quaternized to produce a graft copolymer containing pendant cationic quaternary ammonium groups as the additional pigment anchoring group. Quaternary ammonium anchoring groups can be, and preferably are, attached to the graft copolymer by contacting the tertiary amine functional groups built into the backbone with an alkylation agent. Total alkylation should be at least about 30% of the tertiary amine moieties, preferably at least about 50%. The tertiary amine functional groups are preferably converted to the quaternary state after the formation of the basic copolymer structure by bringing the cationic precursor unit into contact with conventional alkylation agents, such as aralkyl halides, alkyl halides, alkyl toluene sulfonate, or trialkyl phosphates halides. Alkylation agents which have been found to be particularly satisfactory include, benzyl chloride, methyl toluene sulfonate, and dimethyl sulfate.

Other possibilities for attaching the forgoing pigment anchoring groups to the graft copolymer will be apparent to persons skilled in the art.

In addition to the anchoring groups above, the graft copolymer may also, and preferably does, contain other polar functional groups, such as hydroxyl groups, capable of reacting with film forming binder components in the paint composition to crosslink the dispersant into the binder matrix and become a permanent part of the paint film. This enhances film adhesion, improves the overall mechanical properties of the paint in general, and prevents deterioration or delamination of the film upon aging, as may occur if the dispersant remained an unreacted component. The hydroxyl groups may be placed in the backbone or in the macromonomer arms, or both. The preferred location, though, is in the backbone. While a wide variety of ethylenically unsaturated monomers can be used which introduce appropriate pendant hydroxyl groups to the desired segment during its polymerization, acrylic monomers and in particular hydroxy functional acrylate and methacrylate monomers are preferred. Hydroxy functional methacrylates that can be used include 2-hydroxyethyl methacrylate, 3-hydroxypropyl methacrylate, 4-hydroxylbutyl methacrylate, and the like. Hydroxyl acrylates can also be used such as 2-hydroxyethyl acrylate, 3-hydroxypropyl acrylate, 4-hydroxybutyl acrylate, and the like. The hydroxyl groups are preferably provided in a concentration of up to about 30% by weight of the graft copolymer. This generally translates to a hydroxyl value of about 10 to 150.

While not wishing to be bound by any particular theory, these graft polymers when used as pigment dispersants are thought to work by anchoring onto and forming a layer of polymer surrounding the pigment particle, which layer extends into the surrounding solvent medium to provide steric stabilization of the pigment particles. The pigment particles then do not come close enough to one another to flocculate, unless there is insufficient interaction between the dispersant polymer and the pigment surfaces. The pigment anchoring groups employed herein have been found to interact effectively with a much wider range of pigments in comparison to conventional dispersants, which enables the graft copolymers of the present invention to be selectively adsorbed by a wider range of pigments and not be displaced from pigment surfaces by polar solvents or other polar functional groups contained in the final paint composition which could compete for adsorption on the pigment surface. Stable and non-flocculating dispersions can thus easily be formed.

Such graft copolymers can be used to form a pigment dispersion or a millbase. Pigments are added to the graft copolymer in the customary organic solvent or solvent blend and are dispersed using conventional techniques such as high speed mixing, ball milling, sand grinding, attritor guiding, or two or three roll milling. The resulting pigment dispersion has a pigment to dispersant binder weight ratio of about 0.1/100 to 2000/100.

Any of the conventional pigments used in paints can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, phtalocyanines, perylenes, azo pigment, and indanthrones carbazoles such as carbazole violet, isoindolinones, isoindolons, thioindigio reds, and benzimidazolinones; and metallic flakes such as aluminum flake, pearlescent flakes, and the like.

It may be desirable to add other optical ingredients to the pigment dispersion such as antioxidants, flow control agents, UV stabilizers, light quenchers and absorbers, and rheology control agents such as fumed silica and microgels. Other film forming polymers can also be added such as acrylics, acrylourethanes, polyester urethanes, polyesters, alkyds, polyethers and the like.

Pigment dispersions of this invention can be added to a variety of solvent borne coating or paint compositions such as primers, primer surfacers, topcoats which may be monocoats, or basecoats of a clearcoat/basecoat finish. These compositions may contain film-forming polymers such as hydroxy functional acrylic and polyester resins and crosslinking agents such as blocked isocyanates, alkylated melamines, polyisocyanates, epoxy resins, and the like. Preferably, the graft copolymer contains functional groups that will become part of the final network structure by reacting with the crosslinkers.

The following examples illustrate the invention. All parts and percentages are on a weight basis unless otherwise indicated. All molecular weights are determined by gel permeation chromatography (GPC) using a polymethyl methacrylate standard. Mn represents number average molecular weight and Mw represents weight average molecular weight. All viscosity measurements are reported using a Gardner Holtz scale.

EXAMPLES

Example 1
Preparation of BMA/MMA Macromonomer, 50/50% by Weight

This example illustrates the preparation of a macromonomer that can be used to form a graft copolymer of this invention. A 12-liter flask was equipped with a thermometer, stirrer, additional funnel, heating mantle, reflux condenser and a means of maintaining a nitrogen blanket over the reactants. The flask was held under nitrogen positive pressure and the following ingredients were employed.

|  | Weight (gram) |
| --- | --- |
| Portion 1 |  |
| methyl ethyl ketone | 1320 |
| methyl methacrylate (MMA) | 518.4 |
| butyl methacrylate (BMA) | 518.4 |
| Portion 2 |  |
| diaquabis(borondifluorodiphenyl glyoximato) cobaltate (II), Co(DPG-BF$_2$) | 0.102 |
| methyl ethyl ketone | 167.9 |
| Portion 3 |  |
| 2,2'-azobis(methylbutyronitrile) (Vazo ® 67 by DuPont Co., Wilmington, DE) | 8.49 |
| methyl ethyl ketone | 110 |
| Portion 4 |  |
| methyl methacrylate (MMA) | 2073.6 |
| butyl methacrylate (BMA) | 2073.6 |
| Portion 5 |  |
| 2,2'-azobis(methylbutyronitrile) (Vazo ® 67 by DuPont Co., Wilmington, DE) | 84.9 |
| methyl ethyl ketone | 1100 |
| Total | 7975.392 |

Portion 1 mixture was charged to the flask and the mixture was heated to reflux temperature and refluxed for about 20 minutes. Portion 2 solution was then added to the flask over a 5 minute period and the reaction mixture was refluxed for 10 minutes. Portion 3 was then added over 5 minutes while the reaction mixture was held at reflux temperature. Portion 4 and Portion 5 were then simultaneously fed to the reactor over 240 minutes while the reaction mixture was held at reflux temperature throughout the course of additions. Reflux was continued for another 2 hours and the solution was cooled to room temperature and filled out. The resulting macromonomer solution was a light yellow clear polymer solution and had a solid content of about 65.3%. The macromonomer had a 5,617 Mw and 3,677 Mn.

Example 2
Preparation of a Graft Copolymer with Cyclic Amide Groups

This shows the preparation of a graft copolymer of this invention containing cyclic amide and hydroxyl groups in the backbone, specifically N-vinyl-2-pyrrolidinone-co-2-hydroxyethyl acrylate-g-butyl methacrylate-co-methyl methacrylate, 14/8//39/39% by weight from the macromonomer prepared in Example 1.

A 2-liter flask was equipped as in Example 1. The flask was held under nitrogen positive pressure and the following ingredients were employed.

|  | Weight (gram) |
| --- | --- |
| Portion 1 |  |
| macromonomer of Example 1 | 864.0 |
| ethyl acetate | 15.0 |
| Portion 2 |  |
| N-vinyl-2-pyrrolidinone | 100.8 |
| 2-hydroxyethyl acrylate | 57.6 |
| Portion 3 |  |
| t-butyl peroctoate (Elf Atochem North America, Inc., Philadelphia, PA) | 10.0 |
| ethyl acetate | 90.0 |
| Portion 4 |  |
| butyl acetate | 302.5 |
| Total | 1439.9 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 solution was added. After cooling the polymer solution was filled out to yield a 49.5% polymer solution. This graft copolymer contains a random copolymer of N-vinyl-2-pyrrolidinone and 2-hydroxyethyl acrylate in the backbone and a random copolymer of butyl methacrylate and methyl methacrylate in the arms.

The graft copolymer had a 36,721 Mw and 11,719 Mn and a Gardner-Holtz viscosity of N.

Example 3
Preparation of a Graft Copolymer with Cyclic Amide and Amine Groups This example shows the preparation of a graft copolymer of this invention containing cyclic amide and amine groups in the backbone, specifically N-vinyl-2-pyrrolidinone-co-2-hydroxyethyl acrylate-co-N,N-dimethylaminoethyl acrylate-g-butyl methacrylate-co-methyl methacrylate, 12/8/5//37.5/37.5% by weight, from a macromonomer.

A 2-liter flask was equipped as in Example 1. The flask was held under nitrogen positive pressure and the following ingredients were employed.

|  | Weight (gram) |
| --- | --- |
| Portion 1 |  |
| macromonomer of Example 1 | 830.8 |
| ethyl acetate | 10.0 |
| Portion 2 |  |
| N-vinyl-2-pyrrolidinone | 86.4 |
| N,N-dimethylaminoethyl acrylate | 36.0 |

-continued

| | Weight (gram) |
|---|---|
| 2-hydroxyethyl acrylate | 57.6 |
| Portion 3 | |
| t-butyl peroctoate (Elf Atochem North America, Inc., Philadelphia, PA) | 10.0 |
| ethyl acetate | 90.0 |
| Portion 4 | |
| butyl acetate | 319.2 |
| Total | 1440.0 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 solution was added. After cooling the polymer solution was filled out to yield a 50.1% polymer solution. This graft copolymer contains a random copolymer of N-vinyl-2-pyrrolidinone and 2-hydroxyethyl acrylate, and N-N-dimethylaminoethyl acrylate in the backbone and a random copolymer of butyl methacrylate and methyl methacrylate in the arms. The graft copolymer had a Gardner-Holtz viscosity of Q.

Example 4
Preparation of a Graft Copolymer with Cyclic Amide and Aromatic Amine Groups This example shows the preparation of a graft copolymer of this invention containing cyclic amide and aromatic amine groups in the backbone, specifically N-vinyl-2-pyrrolidinone-co-2-hydroxyethyl acrylate-co-glycidyl methacrylate (N-benzylmethylamine)-g-butyl methacrylate-co-methyl methacrylate, 11.5/7.7/4.8(4.1)//36.0/36.0% by weight, from a macromonomer.

A 2-liter flask was equipped as in Example 1. The flask was held under nitrogen positive pressure and the following ingredients were employed.

| | Weight (gram) |
|---|---|
| Portion 1 | |
| macromonomer of Example 1 | 830.8 |
| ethyl acetate | 20.0 |
| Portion 2 | |
| N-vinyl-2-pyrrolidinone | 86.4 |
| glycidyl methacrylate | 36.0 |
| 2-hydroxyethyl acrylate | 57.6 |
| Portion 3 | |
| t-butyl peroctoate (Elf Atochem North America, Inc., Philadelphia, PA) | 10.0 |
| ethyl acetate | 90.0 |
| Portion 4 | |
| N-benzylmethylamine (Aldrich Chemical Co., Inc. Milwaukee, WI) | 31.0 |
| propyleneglycol monomethyl ether acetate | 350.0 |
| Portion 5 | |
| butyl acetate | 320.2 |
| Total | 1832.0 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1 hour. Portion 4 mixture was added, and about 330.0 grams of volatile solvents were distilled by gradually raising the reaction temperature. The total reaction time including the time required for the distillation is 3 hours. Portion 5 was added. After cooling the polymer solution was filled out to yield a 49.8% polymer solution. This graft copolymer contains a random copolymer of N-vinyl-2-pyrrolidinone, 2-hydroxyethyl acrylate, and a reaction product of glycidyl methacrylate and N-benzylmethylamine in the backbone and a random copolymer of butyl methacrylate and methyl methacrylate in the arms. The graft copolymer had a 38,962 Mw and 10,491 Mn and a Gardner-Holtz viscosity of X-½.

Example 5
Preparation of a Graft Copolymer with Cyclic Amide, Amine, and Quaternized Ammonium Groups This example shows the preparation of a graft copolymer of this invention containing cyclic amide, amine, and quaternized amine groups in the backbone, specifically N-vinyl-2-pyrrolidinone-co-2-hydroxyethyl acrylate-co-N,N-dimethylaminoethyl acrylate (methyl p-toluenesulfonate)-g-butyl methacrylate-co-methyl methacrylate, 11.6/7.7/2.9 (3.4)//37.2/37.2% by weight, from a macromonomer.

A 2-liter flask was equipped as in Example 1. The flask was held under nitrogen positive pressure and the following ingredients were employed.

| | Weight (gram) |
|---|---|
| Portion 1 | |
| macromonomer of Example 1 | 852.93 |
| ethyl acetate | 10.0 |
| Portion 2 | |
| N-vinyl-2-pyrrolidinone | 86.4 |
| N,N-dimethylaminoethyl acrylate | 21.6 |
| 2-hydroxyethyl acrylate | 57.6 |
| Portion 3 | |
| t-butyl peroctoate (Elf Atochem North America, Inc., Philadelphia, PA) | 10.0 |
| ethyl acetate | 90.0 |
| Portion 4 | |
| methyl p-toluenesulfonate (Aldrich Chemical Co., Inc. Milwaukee, WI) | 25.47 |
| propyleneglycol monomethyl ether acetate | 480.0 |
| Portion 5 | |
| butyl acetate | 186.8 |
| Total | 1820.8 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 mixture was added, and about 330.0 grams of volatile solvents were distilled by gradually raising the reaction temperature. The total reaction time including the time required for the distillation is 2 hours. Portion 5 was added. After cooling the polymer solution was filled out to yield a 50.5% polymer solution. This graft copolymer contains a random copolymer of N-vinyl-2-pyrrolidinone, 2-hydroxyethyl acrylate, and of N,N-dimethylaminoethyl acrylate (90% quaternized with methyl p-toluenesulfonate)

in the backbone and a random copolymer of butyl methacrylate and methyl methacrylate in the arms. The graft copolymer had a Gardner-Holtz viscosity of Z2.

Example 6
Preparation of a Graft Copolymer with Cyclic Amide and Aromatic Ester Groups This example shows the preparation of a graft copolymer of this invention containing cyclic amide and aromatic ester groups in the backbone, specifically N-vinyl-2-pyrrolidinone-co-2-hydroxyethyl acrylate-co-glycidyl methacrylate (p-nitrobenzoic acid)-g-butyl methacrylate-co-methyl methacrylate, 10.5/5.3/10.5(12.4)//30.7/30.7%% by weight, from a macromonomer.

A 2-liter flask was equipped as a Example 1. The flask was held under nitrogen positive pressure and the following ingredients were employed.

|  | Weight (gram) |
|---|---|
| Portion 1 | |
| macromonomer of Example 1 | 689.24 |
| ethyl acetate | 20.0 |
| Portion 2 | |
| N-vinyl-2-pyrrolidinone | 76.8 |
| glycidyl methacrylate | 76.8 |
| 2-hydroxyethyl acrylate | 38.4 |
| Portion 3 | |
| t-butyl peroctoate (Elf Atochem North America, Inc., Philadelphia, PA) | 10.0 |
| ethyl acetate | 100.0 |
| Portion 4 | |
| p-nitrobenzoic acid (Aldrich Chemical Co., Inc Milwaukee, WI) | 92.1 |
| propylene carbonate | 260.0 |
| benzyltrimethylammonium hydroxide (60% solution in methanol, Aldrich Chemical Co., Inc., Milwaukee, WI) | 7.53 |
| Portion 5 | |
| butyl acetate | 379.7 |
| Total | 1750.57 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 mixture was added, and the reaction mixture was refluxed for 2 hours. Then about 290.0 grams of volatile solvents was distilled by gradually raising the reaction temperature. Portion 5 was added. After cooling the polymer solution was filled out to yield a 51.5% polymer solution. This graft copolymer contains a random copolymer of N-vinyl-2-pyrrolidinone, 2-hydroxyethyl acrylate, and a reaction product of glycidyl methacrylate and p-nitrobenzoic acid in the backbone and a random copolymer of butyl methacrylate and methyl methacrylate in the arms. The graft copolymer had a 29,519 Mw and 10,451 Mn and a Gardner-Holtz viscosity of Y.

Example 7
Preparation of a Graft Copolymer with Acyclic Amide Groups

This shows the preparation of a graft copolymer of this invention containing amide and hydroxyl groups in the backbone, specifically, N-N-dimethyl acrylamide-co-2-hydroxyethyl acrylate-5-butyl methacrylate-co-methyl methacrylate, 14/8//39/39% by weight, from a macromonomer

|  | Weight (gram) |
|---|---|
| Portion 1 | |
| macromonomer of Example 2 | 864.0 |
| ethyl acetate | 15.0 |
| Portion 2 | |
| N,N-dimethyl acrylamide | 100.8 |
| 2-hydroxyethyl acrylate | 57.6 |
| Portion 3 | |
| t-butyl peroctoate (Elf Atochem North America, Inc., Philadelphia, PA) | 10.0 |
| ethyl acetate | 90.0 |
| Portion 4 | |
| butyl acetate | 302.5 |
| Total | 1439.9 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 solution was added. After cooling the polymer solution was filled out to yield a 50.7% polymer solution. This graft copolymer contains a random copolymer of N,N-dimethyl acrylamide and 2-hydroxyethyl acrylate in the backbone and a random copolymer of butyl methacrylate and methyl methacrylate in the arms. The graft copolymer had a 37,053 Mw and 10,957 Mn and a Gardner-Holtz viscosity of R.

Example 8
Preparation of a Graft Copolymer with Acyclic Amide and Amine Groups This example shows the preparation of a graft copolymer of this invention containing amide and amine groups in the backbone, specifically N,N-dimethyl acrylamide-co-2-hydroxyethyl acrylate-co-N,N-dimethylaminoethyl acrylate-g-butyl methacrylate-co-methyl methacrylate, 12/8/5//37.5/37.5% by weight, from a macromonomer.

A 2-liter flask was equipped as in Example 1. The flask was held under nitrogen positive pressure and the following ingredients were employed.

|  | Weight (gram) |
|---|---|
| Portion 1 | |
| macromonomer of Example 1 | 830.8 |
| ethyl acetate | 10.0 |
| Portion 2 | |
| N,N-dimethyl acrylamide | 86.4 |
| N,N-dimethylaminoethyl acrylate | 36.0 |
| 2-hydroxyethyl acrylate | 57.6 |
| Portion 3 | |
| t-butyl peroctoate (Elf Atochem North America, Inc., Philadelphia, PA) | 10.0 |
| ethyl acetate | 90.0 |

-continued

| | Weight (gram) |
|---|---|
| Portion 4 | |
| propyleneglycol monomethyl ether acetate | 320.0 |
| Portion 5 | |
| butyl acetate | 319.2 |
| Total | 1770.2 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 solution was added. Then about 330.0 grams of volatile solvents was distilled by gradually raising the reaction temperature. Portion 5 was added. After cooling the polymer solution was filled out to yield a 51.5% polymer solution. This graft copolymer contains a random copolymer of N,N-dimethyl arylamide, 2-hydroxyethyl acrylate, and N,N-dimethylaminoethyl acrylate in the backbone and a random copolymer of butyl methacrylate and methyl methacrylate in the arms. The graft copolymer had a Gardner-Holtz viscosity of W.

Example 9

Preparation of a Graft Copolymer with Acyclic Amide, Amine, and Quaternized Ammonium Groups This example shows the preparation of a graft copolymer of this invention containing amide, amine, and quaternized amine groups in the backbone, specifically N,N-dimethyl acrylamide-co-2-hydroxyethyl acrylate-co-N,N-dimethylaminoethyl acrylate (methyl p-toluenesulfonate)-g-butyl methacrylate-co-methyl methacrylate, 11.7/7.8/2.9 (2.7)//37.5/37.5% by weight, from a macromonomer.

A 2-liter flask was equipped as in Example 1. The flask was held under nitrogen positive pressure and the following ingredients were employed.

| | Weight (gram) |
|---|---|
| Portion 1 | |
| macromonomer of Example 1 | 852.93 |
| ethyl acetate | 10.0 |
| Portion 2 | |
| N,N-dimethyl acrylamide | 86.4 |
| N,N-dimethylaminoethyl acrylate | 21.6 |
| 2-hydroxyethyl acrylate | 57.6 |
| Portion 3 | |
| t-butyl peroctoate (Elf Atochem North America, Inc., Philadelphia, PA) | 10.0 |
| ethyl acetate | 90.0 |
| Portion 4 | |
| methyl p-toluenesulfonate (Aldrich Chemical Co., Inc. Milwaukee, WI) | 19.68 |
| propyleneglycol monomethyl ether acetate | 450.0 |
| Portion 5 | |
| butyl acetate | 210.9 |
| Total | 1809.11 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 mixture was added, and about 330.0 grams of volatile solvents were distilled by gradually raising the reaction temperature. The total reaction time including the time required for the distillation is 2 hours. Portion 5 was added. After cooling the polymer solution was filled out to yield a 51.1% polymer solution. This graft copolymer contains a random copolymer of N,N-dimethyl acrylamide, 2-hydroxyethyl acrylate, and of N,N-dimethylaminoethyl acrylate (70% quaternized with methyl p-toluenesulfonate) in the backbone and a random copolymer of butyl methacrylate and methyl methacrylate in the arms. The graft copolymer had a Gardner-Holtz viscosity of Z.

Example 10

Preparation of a Graft Copolymer with Acyclic Amide and Aromatic Ester Groups

This example shows the preparation of a graft copolymer of this invention containing amide and aromatic ester groups in the backbone, specifically N,N-dimethyl acrylamide-co-2-hydroxyethyl acrylate-co-glycidyl methacrylate (p-nitrobenzoic acid)-g-butyl methacrylate-co-methyl methacrylate, 10.5/7.0/10.5(12.4)//29.8/29.8% by weight, from a macromonomer.

A 2-liter flask was equipped as in Example 1. The flask was held under nitrogen positive pressure and the following ingredients were employed.

| | Weight (gram) |
|---|---|
| Portion 1 | |
| macromonomer of Example 1 | 669.54 |
| ethyl acetate | 20.0 |
| Portion 2 | |
| N,N-dimethyl acrylamide | 76.8 |
| glycidyl methacrylate | 76.8 |
| 2-hydroxyethyl acrylate | 51.2 |
| Portion 3 | |
| t-butyl peroctoate (Elf Atochem North America, Inc., Philadelphia, PA) | 10.0 |
| ethyl acetate | 100.0 |
| Portion 4 | |
| p-nitrobenzoic acid (Aldrich Chemical Co., Inc, Milwaukee, WI) | 92.1 |
| propylene carbonate | 260.0 |
| benzyltrimethylammonium hydroxide (60% solution in methanol, Aldrich Chemical Co., Inc., Milwaukee, WI) | 7.53 |
| Portion 5 | |
| butyl acetate | 376.5 |
| Total | 1740.47 |

Portion 1 mixture was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1.5 hours. Portion 4 mixture was added, and the reaction mixture was refluxed for 2 hours. Then about 280.0 grams of volatile solvents were distilled by gradually raising the reaction temperature. Portion 5 was added. After cooling the polymer solution was filled out to yield a 50.6% polymer solution. This graft copolymer contains a random copolymer of N,N-dimethyl acrylamide, 2-hydroxyethyl acrylate, and a reaction product of glycidyl methacrylate and p-nitrobenzoic acid in the backbone and a random copolymer of butyl methacrylate and methyl methacrylate in the arms. The graft copolymer had a 39,078 Mw and 10,383 Mn and a Gardner-Holtz viscosity of Z-¼.

Comparative Example

This shows the preparation of a graft copolymer containing acrylates only in the backbone for comparative purposes, specifically methyl acrylate-co-2-hydroxyethyl acrylate-g-butyl methacrylate-co-methyl methacrylate, 17/8//37.5/37.5% by weight, from a macromonomer using the following ingredients.

|  | Weight (gram) |
|---|---|
| Portion 1 | |
| macromonomer of Example 1 | 830.8 |
| ethyl acetate | 10.0 |
| Portion 2 | |
| methyl acrylate | 122.4 |
| 2-hydroxyethyl acrylate | 57.6 |
| Portion 3 | |
| t-butyl peroctoate (Elf Atochem North America, Inc., Philadelphia, PA) | 9.0 |
| ethyl acetate | 90.0 |
| Portion 4 | |
| propyleneglycol monomethyl ether acetate | 480.2 |
| Total | 1600.00 |

The procedure of Example 2 was repeated to yield a 49.1% clear polymer solution. This graft copolymer contains a copolymer of methyl acrylate, and 2-hydroxyethyl acrylate in the backbone and a random copolymer of butyl methacrylate and methyl methacrylate in the arms. The graft copolymer had a 52,927 Mw and 12,000 Mn and a Gardner-Holtz viscosity of M.

Example 11

Evaluation of Dispersant Properties

The dispersant effectiveness was determined by sand-grinding a mixture of pigment, solvent, and dispersant, and observing the dispersion quality under an Olympus microscope, 40x. The well dispersed system would have a uniform appearance and the pigment particles would show vigorous Brownian motion. In contract, the flocculated systems would have islands of flocculated pigment chunks interspersed with areas of relatively clear solvent.

The dispersion samples were prepared by the following procedure. To a 2 oz. glass bottle, 15 gm of sand, 20 gm of butyl acetate, 2 gm of pigment and 1 gm of the graft copolymer dispersant solution were added. The bottle was sealed and agitated on a Red Devil plant shaker for 15 minutes.

Results

| Pigment | Ex 2 | Ex 3 | Ex 4 | Ex 5 | Ex 6 | Ex 7 | Ex 8 | Ex 9 | Ex 10 | Cl |
|---|---|---|---|---|---|---|---|---|---|---|
| 1 | F | F | F | F | F | F | F | F | F | F |
| 2 | D | F | D | F | D | D | F | D | D | F |
| 3 | D | D | D | D | D | D | D | D | D | F |
| 4 | D | D | D | D | D | D | D | D | D | D |
| 5 | D | D | D | D | D | D | D | D | D | F |
| 6 | D | D | D | D | D | D | D | D | D | D |
| 7 | F | F | F | F | D | F | F | D | D | F |
| 8 | D | D | D | D | D | D | D | D | D | D |
| 9 | D | D | D | D | D | D | D | D | D | D |
| 10 | D | D | D | D | D | SF | D | D | D | F |
| 11 | F | F | F | F | D | SF | F | D | D | F |
| 12 | F | D | D | D | D | D | D | D | D | D |
| 13 | D | D | D | D | D | D | D | D | D | F |
| 14 | D | D | D | D | D | D | D | D | D | D |
| 15 | D | D | D | D | D | D | D | D | D | D |
| 16 | D | D | D | D | D | D | D | D | D | D |

D: Deflocculated or dispersed
SF: Slightly flocculated
F: Flocculated
1. Monastral Red YRT-759D (Ciba-Geigy Corp., Pigment Div., Newport, DE)
2. Irgazin DDP Red BO (Ciba-Geigy Corp., Pigment Div., Newport, DE)
3. Raven 5000 carbon black (Columbian Chemicals Co., Atlanta, GA)
4. Titanium dioxide R706 (DuPont Co., Wilmington, DE)
5. Sunfast green 7 (Sun Chemical Corp., Cincinnati, OH)
6. Endurophthal blue BT-617D (Clariant Corp., Coventry, RI)
7. Irgazin blue ATC (Ciba-Geigy Corp., Pigment Div., Newport, DE)
8. Magenta RT-355D (Ciba-Geigy Corp., Pigment Div., Newport, DE)
9. Perylene maroon R-6436 (Bayer Corp., Pittsburgh, PA)
10. Sicotrans red (BASF Corp., Colorant Division, Mount Olive, NJ)
11. Hostaperm yellow H-3G (Clariant Corp., Coventry, RI)
12. Irgacolor yellow (Ciba-Geigy Corp., Pigment Div., Newport, DE)
13. Irgazin blue X-3367 (Ciba-Geigy Corp., Pigment Div., Newport, DE)
14. Violet RT-101D (Ciba-Geigy Corp., Pigment Div., Newport, DE)
15. Bayferrox 3920 (Bayer Corp., Pittsburg, PA)
16. Monastral magenta RT-143D (Ciba-Geigy Corp., Pigment Div., Newport, DE)

Based on these test results, the graft structure and the polar hydroxyl on the backbone have provided some dispersing power to the polymer as in the Comparative Example. However, the ones with the amide functional groups on the backbone and particularly the ones with additional specific pigment anchoring groups of this invention are far more effective for a wide range of pigment types.

Various modifications, alterations, additions or substitutions of the components if the compositions of this invention will be apparent to those skilled in the art without departing from the spirit and scope of this invention. This invention is not limited by the illustrative embodiments set forth herein, but rather is defined by the following claims.

What is claimed is:

1. A composition suitable for use as a pigment dispersant in organic medium, comprising a graft copolymer having a macromonomer grated onto a polymer backbone, wherein the graft copolymer has attached to the backbone an amide functional group as a pigment anchoring group, wherein the pigment anchoring group is formed from ethylenically unsaturated monomers that are copolymerized into the backbone, which monomers are selected from the group consisting of
   i) acrylamide and methacrylamide monomers containing an acyclic amide group,
   ii) acrylic and methacrylic monomers containing a cyclic amide group, iii) acrylamide and methacrylamide monomers containing a cyclic amide group, iv) N-vinyl monomers containing a cyclic amide group, and v) any mixtures of said monomers, and further wherein the macromonomer consists essentially of macromonomers that are soluble in organic medium.

2. The composition of claim 1 wherein the backbone contains an additional pigment anchoring group selected from the group consisting of aromatic ester, aromatic amine, aliphatic amine, and quaternary ammonium groups, or mixtures thereof.

3. The composition of claim 1 wherein said graft copolymer is formed by a macromonomer approach.

4. The composition of claim 1 wherein the pigment anchoring group is an acyclic amide group formed from polymerized acrylamide or methacrylamide monomers represented by the formula

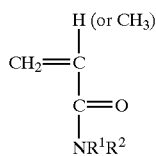

wherein $R^1$ and $R^2$ are independently selected from the group consisting of hydrogen, alkyl, aryl, arylalkyl, and alkylaryl groups having 1 to 20 carbon atoms, and optionally containing one or more substituents that do not interfere with backbone polymerization.

5. The composition of claim 1 wherein the pigment anchoring group is a cyclic amide group formed from polymerized ethylenically unsaturated monomers having a cyclic amide functional group represented by the formula

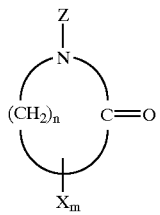

wherein n is an integer from 3 to 7, m is 0 or an integer from 1 to 3, X is a substituent on the cyclic structure selected from the group consisting of an alkyl, aryl, arylalkyl, and alkylaryl group having 1 to 20 carbon atoms, and may contain substituents which do not interfere with polymerization including hydroxy, amino, ester, acid, acyloxy, amide, nitrile, halogen, and alkoxy group and Z is a radical center which is connected to the remainder of the ethylenically unsaturated monomer.

6. The composition of claim 1 wherein the pigment anchoring group is a cyclic amide group formed from polymerized ethylenically unsaturated monomers having a cyclic amide functional group represented by the formula

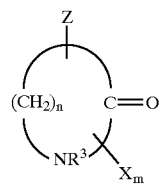

wherein n is an integer from 3 to 7, m is 0 or an integer from 1 to 3, X is a substituent on the cyclic structure selected from the group consisting of an alkyl, aryl, arylalkyl, and alkylaryl group having 1 to 20 carbon atoms, and may contain substituents which do not interfere with polymerization including hydroxy, amino, ester, acid, acyloxy, amide, nitrile, halogen, and alkoxy group, $R^3$ is selected from the group consisting of alkyl group, aryl group, arylalkyl group, and alkylaryl group having 1 to 20 carbon atoms, and may contain substituents which do not interfere with polymerization including hydroxy, amino, ester, acid, acyloxy, amide, nitrile, halogen, and alkoxy groups, and Z is a radical center which is connected to the remainder of the ethylenically unsaturated monomer.

7. The composition of claim 1 wherein the pigment anchoring group is a cyclic amide group formed from polymerized substituted or unsubstituted N-vinyl monomers.

8. The composition of claim 1 wherein the pigment anchoring group is a cyclic amide group formed from polymerized N-vinyl-2-pyrrolidinone monomers.

9. The composition of claim 2 wherein said additional anchoring group is an aromatic ester group prepared by contacting an epoxy functional group on the backbone with a substituted or unsubstituted aromatic carboxylic acid.

10. The composition of claim 2 wherein said additional anchoring group is an aromatic amine group prepared by contacting an epoxy functional group on the backbone with a substituted or unsubstituted secondary aromatic amine.

11. The composition of claim 2 wherein the anchoring group is an aliphatic amine group prepared by directly copolymerizing acrylic monomers containing tertiary amine functional groups in the backbone.

12. The composition of claim 2 wherein the anchoring group is a quaternary ammonium group prepared by contacting a tertiary amine functional group on the backbone with an alkylation agent.

13. The composition of claim 1 wherein the amide functional group comprises at least about 20% by weight of the backbone.

14. The composition of claim 1 wherein said graft copolymer contains hydroxyl groups on either or both the backbone or macromonomer.

15. A graft copolymer composition suitable for use as a pigment dispersant in organic medium, comprising about:

a) 10 to 90% by weight, based on the weight of the graft copolymer, of a polymeric backbone of ethylenically unsaturated monomers;

b) 90 to 10% by weight, based on the weight of the graft copolymer, of a macromonomer having one terminal ethylenically unsaturated group grafted onto said backbone, wherein the graft copolymer contains in the backbone at least about 20% by weight, based on the total weight of the backbone, of a pigment anchoring group selected from the group consisting of cyclic and acyclic amide functional groups, wherein the pigment anchoring group is formed from monomers that are copolymerized into the backbone, which monomers are selected from the group consisting of methacrylamide, acrylamide and N-vinyl pyrrolidinone monomers, or mixtures thereof, and wherein the macromonomer consists essentially of macromonomers soluble in organic medium.

16. The composition of claim 15 wherein the backbone further contains at least about 1% by weight, based on the total weight of the backbone, of an additional pigment anchoring group selected from the group consisting of aromatic ester, aromatic amine, aliphatic amine, and quaternary ammonium groups, or mixtures thereof.

17. The composition of claim 15 wherein the graft copolymer further contains up to about 30% by weight, based on the total weight of the graft copolymer, of hydroxyl functional groups in either or both the backbone.

18. The composition of claim 15 wherein the graft copolymer has a weight average molecular weight of at least about 3000.

19. A pigment dispersion comprising a pigment in an organic solvent dispersed by means of a composition of claim 1.

20. The composition of claim 1 wherein the graft copolymer is prepared in an organic solvent or solvent blend.

21. The composition of claim 15 wherein the graft copolymer is prepared in an organic solvent or solvent blend.

* * * * *